June 29, 1971  E. C. MONTGOMERY  3,589,886
FLOAT GLASS APPARATUS WITH A RADIATION GATE
Filed Dec. 8, 1969  2 Sheets-Sheet 2

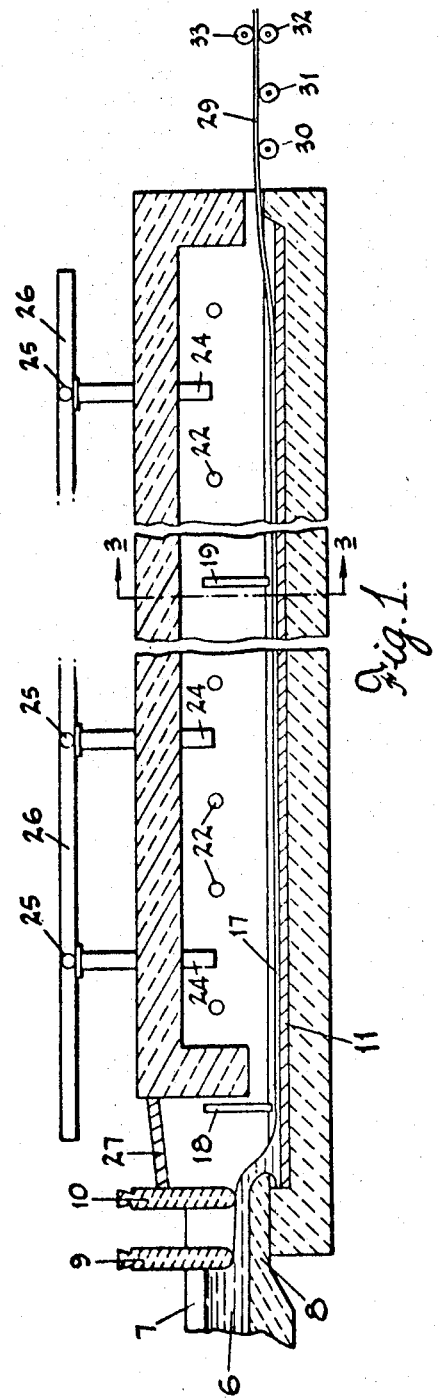
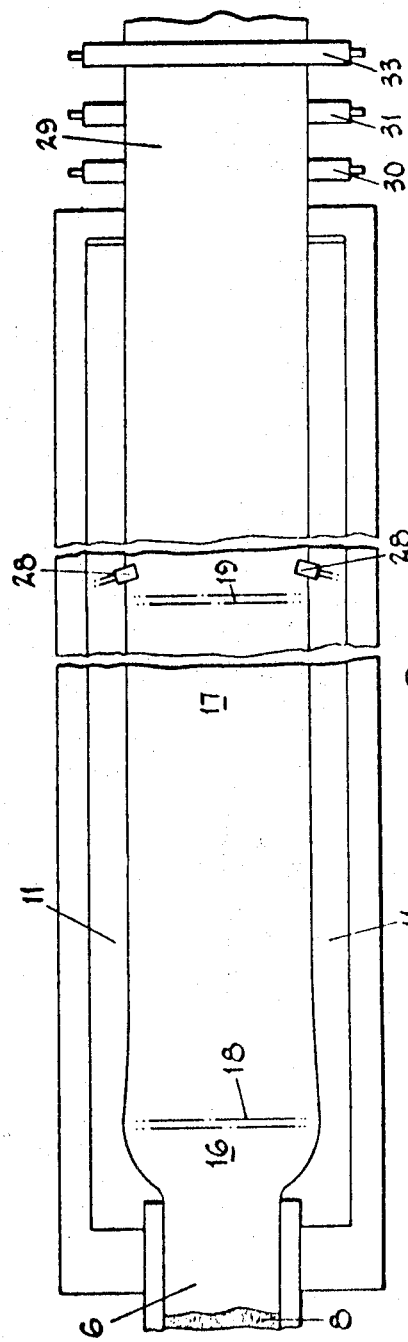

INVENTOR
Edwin C. Montgomery
BY Nobbe & Collins
ATTORNEYS

United States Patent Office 3,589,886
Patented June 29, 1971

3,589,886
FLOAT GLASS APPARATUS WITH A RADIATION GATE
Eldwin C. Montgomery, Modesto, Calif., assignor to Libbey-Owens-Ford Company, Toledo, Ohio
Continuation-in-part of application Ser. No. 612,680, Jan. 30, 1967. This application Dec. 8, 1969, Ser. No. 883,227
Int. Cl. C03b 18/00
U.S. Cl. 65—182                                4 Claims

ABSTRACT OF THE DISCLOSURE

A radiation gate for use in a float glass apparatus involving a metallic casing having a core of insulating material in its lower portion, fluid cooled support means above the core of insulation and an outer wall around the support-containing portion and spaced from the casing with insulation therebetween.

---

This application is a continuation-in-part of application Ser. No. 612,680, now abandoned, filed Jan. 30, 1967.

BACKGROUND OF THE INVENTION

Field of the invention

The present invention relates broadly to apparatus for producing flat glass and more particularly to an improved radiation gate that is especially well adapted for use in the heated atmosphere above the molten metal bath in a float glass machine.

Description of the prior art

A conventional form of float glass forming apparatus is illustrated and described in United States Pat. No. 3,083,551 granted Apr. 2, 1963 and, as there explained the manufacture of flat glass by the float process involves delivering glass at a controlled rate onto a bath of molten metal and advancing it along the surface of the bath within a plenum chamber containing the "float atmosphere" and under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

In the area where the layer of molten glass is established on the metal float bath and where it is developing into a buoyant body of stable thickness relatively high temperatures are maintained in the float atmosphere thereabove whereas beyond this area reduced temperatures are employed to cool the advancing ribbon. Similarly, when the buoyant body is to be attenuated to produce an ultimate ribbon of lesser thickness, a so-called reheat area is required in advance of the cooling area and it is necessary to separate such areas of differing temperatures within the plenum chamber.

Conventional gates or tweels have been used for this purpose but have not proved satisfactory. Moreover, when the prior used gates have had relatively cool metal surfaces htat are exposed to float atmosphere moisture condenses on these surfaces, drops of water drip onto the highly sensitive surface of the float glass ribbon and serious defects results in the finished glass.

SUMMARY

According to the present invention, operating conditions are notably improved and defects, such as described above, are entirely eliminated by the provision of an improved radiation gate, usable anywhere in the plenum chamber of a float glass forming apparatus, that is metal clad and adequately supported but in which necessary cooling means associated with the gate is so insulated from the float atmosphere that moisture will not condense on any exposed part.

BRIEF DESCRIPTION OF THE DRAWINGS

In the drawings wherein like numerals are employed to designate like parts through the same:
FIG. 1 is a longitudinal, sectional view through a conventional float glass forming machine;
FIG. 2 is a plan view of the apparatus of FIG. 1 with the roof structure or plenum chamber removed.

DESCRIPTION OF THE PREFERRED EMBODIMENT

Figure 3:
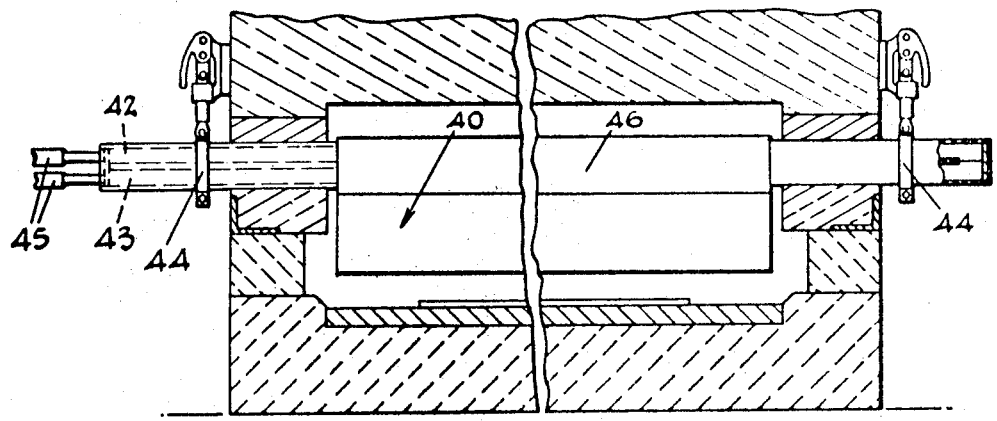
FIG. 3 is a transverse, sectional view taken substantially along the line 3—3 in FIG. 1.

Referring now more particularly to the drawings, there is illustrated in FIGS. 1 and 2 a typical float glass machine similar to one disclosed in U.S. Pat. 3,083,551. In this apparatus molten glass 6 is supplied from a forehearth 7 to a spout lip 8 in an amount regulated and controlled by a tweel 9 and a gate 10.

The glass flowing from the spout 8 onto the metal bath 11 forms a buoyant molten body indicated at 16 and a buoyant layer of stable thickness 17 develops therefrom.

The metal bath in the tank structure and the headspace 21 over the bath are heated by radiant heat directed downwardly from heaters 22 and this headspace 21 which contains the "float atmosphere," is enclosed by a roof structure or plenum chamber 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass (for example, a mixture of nitrogen and hydrogen) and, by providing a plenum ingress to the headspace 21, entrance of atmospheric air is prevented.

When the ultimate ribbon 29 is to be substantially the same thickness as the equilibrium or stable thickness of the glass the temperature of the glass in the buoyant layer or ribbon 17 must be carefully controlled so as to progressively cool it from the area of the tweel or gate 19 to the discharge end of the apparatus by which time the ribbon surface should reach a temperature at which it is sufficiently stiffened to allow its transfer to a lehr on mechanical conveying means without detriment to the surfaces, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 to 33 and thereby modifying their tractional effort and attenuating the molten glass body 17 of stable thickness. However, to produce at the discharge end of the apparatus an ultimate ribbon which has a width approaching the width of the buoyant body of molten glass of stable thickness but thinner than the stable body, horizontally disposed edge rolls indicated at 28 are employed to assist in holding the ribbon to width and the glass temperature must be accurately controlled to regulate the longitudinal change in its viscosity in relation to the tractive effort of the rolls 30 to 33 and so arrest further dimensional change once the ribbon has assumed the desired width and thickness.

Figures 4, 5:
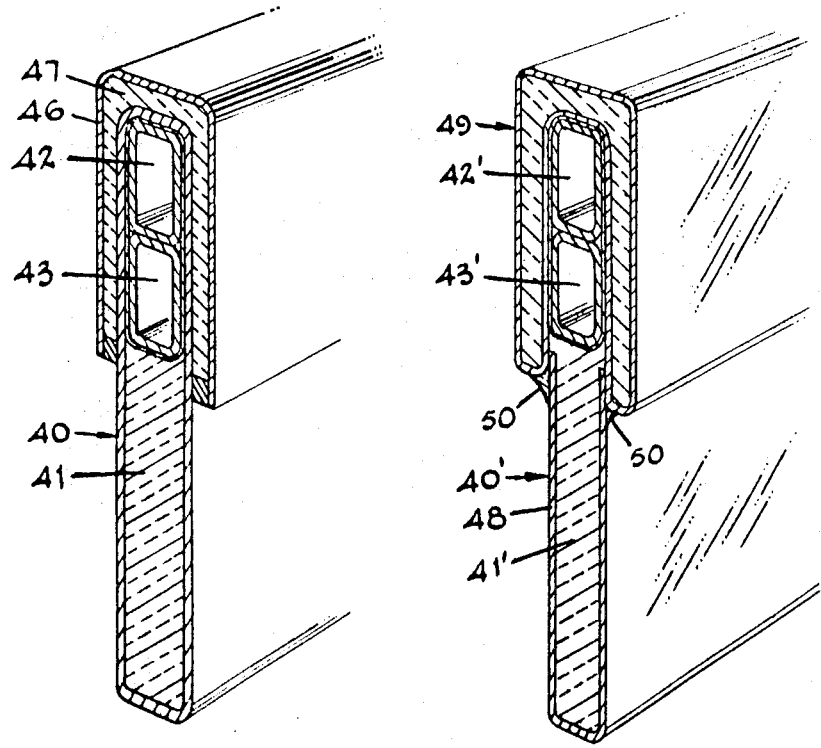
FIG. 4 is a transverse, sectional, perspective view of a preferred embodiment of the radiation gate of the invention.
FIG. 5 is a view, similar to FIG. 4, of a modified gate structure.

According to the invention, special radiation gates are employed in such strategic locations as 18 and 19 for example. These gates are hung so as to permit their being adjusted up and down relative to the molten metal bath when operating conditions require it; but they substantially separate areas of different temperatures in the plenum chamber and, more importantly, act to prevent the radiation of heat from one such area to another. Thus, as best shown in FIG. 4, a gate of the invention may comprise an elongated substantially rectangular hollow metal casing 40 having a core of insulating or refractory material 41 in the lower portion thereof and supporting means such as the superimposed square pipes 42 and 43 through which a cooling fluid can be circulated from supply conduits 45. With this construction the radiation gate can be supported within the plenum chamber 23 from the outside thereof (FIG. 3) by means of suitable, vertically adjustable brackets 44 from which the pipes 42 and 43 are hung and, by proper control of the circulating cooling medium, deterioration and sagging of the support means in the float atmosphere is prevented.

Now, with the gate structure thus far described, moisture would condense during use on the part of the casing dripping of water from the face of the casing 40 that contains the cooled supporting pipes and objectionable dripping of water from the face of the casing 40 onto the ribbon 17 would result. However, with the complete gate of the invention this is not the case.

Thus, according to the invention, a jacket or auxiliary wall 46 is provided in surrounding and spaced relation to that part of the casing 40 in which the water cooled support pipes 42 and 43 are located, and the space between the jacket and casing is filled with lightweight insulation 47. The insulation 47, as well as the core of insulating material 41, may be any suitable insulating material which will withstand the temperatures encountered. It is preferably in fibrous form, although it may suitably be in other forms. For example, asbestos may be employed as the insulation. Likewise, "B & W Kaowool," a kaolin-clay base ceramic fiber produced by the Babcock and Wilcox Co., 161 E. 42nd St., New York, N.Y., may be used. "Fiberfrax," a ceramic fiber product of the Carborundum Co. of Niagara Falls, N.Y., has been found particularly suitable for this purpose. Preferably the insulated jacket 46 overlaps the lower, insulation filled portion of the casing 40 to some extent and, in actual production, has completely overcome the problem of condensation on the radiation gates and so eliminated glass defects due to moisture drippage.

In fact, the special radiation gate of this invention has proved so satisfactory from all standpoints and so improved the operating conditions in the float glass machine in which it was first installed that it is expected that it will shortly be used as original equipment, or to replace the regular tweels, in the problem locations in all of the float glass machines of the assignee company.

In FIG. 5 there has been illustrated a slightly modified form of the radiation gate shown in FIG. 4 and in which the casing 40' is made up with a separate, single wall, lower chamber 48 which contains the core 41' of insulation and a separate, double walled, insulated, upper chamber 49 for the cooled support pipes 42' and 43'. The upper and lower chambers are preferably welded together as at 50 to provide what is in effect a unitary casing that will function in a similar manner to and just as effectively as the integral capped or jacketed casing of FIG. 4.

In fact, it appears that the FIG. 5 construction may have advantages in improved insulation of the cooled supporting pipes especially where the insulation of the core 41' extends between the upper part of the lower chamber wall and the pipes.

In any event, it is to be understood that the forms of the invention herewith shown and described are to be taken as preferred embodiments of the same, but that various changes in the shape, size and arrangement of parts may be resorted to without departing from the spirit of the invention as defined in the claims.

I claim:

1. In float glass producing apparatus including a container, a bath of molten metal in said container, a substantially closed chamber enclosing an atmosphere other than the outside atmosphere over said bath, means for controlling the temperatures within said chamber, means for establishing a buoyant body of molten glass in ribbon form on said metal bath, means for advancing said ribbon along said bath and subjecting the same to a controlled tractive force in the direction of said advance, the improvement comprising a radiation gate extending transversely of said chamber and substantially separating a first area of given temperatures on one side of said gate within said chamber from a second area of differing temperatures on the other side of said gate comprising a metal casing, a core of insulation in the lower portion of said casing, support means for said casing in an upper portion and extending outwardly thereof, said core of insulation extending substantially up to said support means, means for cooling said support means, a jacket around the support containing portion of said casing and spaced therefrom forming an enclosed space between said jacket and said casing, insulating material in said enclosed space between said jacket and said casing, and means outside of said chamber for mounting said casing relative to said metal bath and said chamber.

2. Apparatus as defined in claim 1 in which said casing is elongated and generally rectangular in cross section, said support means are in the form of pipes extending through said elongated casing, said cooling means circulate cooling fluid through said pipes, and said mounting means are in the form of brackets from which said pipes are hung.

3. Apparatus as defined in claim 1 in which said jacket and said insulating material overlap said core of insulation.

4. Apparatus as defined in claim 1 in which said casing and said jacket respectively comprise a single wall lower chamber containing said core of insulation and a double spaced walled upper chamber secured thereto and containing said cooled support means, and said insulating material is located in the space between the walls of said upper chamber.

References Cited

UNITED STATES PATENTS

| 1,656,103 | 1/1928 | Drake | 65—204 |
| 1,788,923 | 1/1931 | Mambourg | 65—204X |
| 3,305,339 | 2/1967 | Plumat | 65—99 |
| 3,326,652 | 6/1967 | Plumat | 65—182X |
| 3,414,397 | 12/1968 | Zellers | 65—203 |

S. LEON BASHORE, Primary Examiner

J. B. HARDAWAY, Assistant Examiner

U.S. Cl. X.R.

65—356, 374